US006964014B1

(12) United States Patent
Parish

(10) Patent No.: US 6,964,014 B1
(45) Date of Patent: Nov. 8, 2005

(54) METHOD AND SYSTEM FOR LOCALIZING WEB PAGES

(75) Inventor: Sandy Parish, Mountain View, CA (US)

(73) Assignee: Networks Associates Technology, Inc., Santa Clara, CA (US)

(*) Notice: Subject to any disclaimer, the term of this patent is extended or adjusted under 35 U.S.C. 154(b) by 885 days.

(21) Appl. No.: 09/784,872

(22) Filed: Feb. 15, 2001

(51) Int. Cl.[7] .............................................. G06F 17/00
(52) U.S. Cl. ........................ 715/513; 704/260; 709/247
(58) Field of Search ............................ 715/513, 536, 715/501.1; 704/260; 709/247

(56) References Cited

U.S. PATENT DOCUMENTS

| | | | |
|---|---|---|---|
| 6,189,137 B1 * | 2/2001 | Hoffman ..................... | 717/115 |
| 6,311,223 B1 * | 10/2001 | Bodin et al. ................ | 709/247 |
| 6,623,529 B1 * | 9/2003 | Lakritz ...................... | 715/536 |
| 6,658,624 B1 * | 12/2003 | Savitzky et al. ............ | 715/513 |
| 6,658,627 B1 * | 12/2003 | Gallup et al. ............... | 715/536 |
| 6,665,642 B2 * | 12/2003 | Kanevsky et al. .......... | 704/260 |
| 6,675,350 B1 * | 1/2004 | Abrams et al. ............. | 715/501.1 |

OTHER PUBLICATIONS

NN9801223, "Tool to Aid Translation of Web Pages into Different National Languages", IBM Technical Disclosure Bulletin, Jan. 1998, US, vol. 41, issue 1, pp. 223-224.*

"The Localization Process: Globalizing Your Code and Localizing Your Site" Sjoert Ebben and Gwyneth Marshall, Microsoft Corporation, Apr. 21, 1999 http://msdn.microsoft.com.workshop/management/intl/locprocess.asp.

* cited by examiner

Primary Examiner—Joseph Feild
Assistant Examiner—James H. Blackwell
(74) Attorney, Agent, or Firm—Zilka-Kotab, PC; Christopher J. Hamaty

(57) ABSTRACT

A computer implemented method for localizing Web pages is disclosed. The method includes reading a computer file containing HTML tags and scripts and identifying character strings located between the HTML tags and within the scripts. A modified version of the computer file is generated by replacing the identified character strings with variables. An include file containing the variables and associated character strings is also generated. The method further includes adding a reference to the include file in the modified version of the computer file.

23 Claims, 12 Drawing Sheets

HTML FILE BEFORE LOCALIZATION

```
<html>

<head>
<title>Sample ASP Page</title>
</head>

<body>
<!-- This is a comment.  The Parser should ignore it -->
<%
   Response.Write "<center> This dynamic text was output
from a script.</center>" & vbCrLf
%>
<br>
This is static text between HTML tags
</body>

</html>
```

FIG. 5

HTML FILE AFTER LOCALIZATION

```
<!--#include virtual="Localizer_test_en.asp"-->
<html>

<head>
<title><%=IDS_SAMPLE_ASP_PAGE %></title>
</head>

<body>
<!-- This is a comment.  The Parser should ignore it -->
<%
   Response.Write "<center>" &
IDS__THIS_DYNAMIC_TEXT_WAS_OUT & "</center>" & vbCrLf
%>
<br>
<%=IDS_THIS_IS_STATIC_TEXT_BETWEE %>
</body>

</html>
```

FIG. 7

VBSCRIPT INCLUDE FILE GENERATED BY LOCALIZER

```
<%
Dim IDS_THIS_IS_STATIC_TEXT_BETWEE
Dim IDS_SAMPLE_ASP_PAGE
Dim IDS__THIS_DYNAMIC_TEXT_WAS_OUT

IDS_THIS_IS_STATIC_TEXT_BETWEE = "This is static text
between HTML tags"
IDS_SAMPLE_ASP_PAGE = "Sample ASP Page"
IDS__THIS_DYNAMIC_TEXT_WAS_OUT = " This dynamic text was
output from a script."
%>
```

FIG. 8

METHOD AND SYSTEM FOR LOCALIZING WEB PAGES

BACKGROUND OF THE INVENTION

The present invention relates generally to network communication systems, and more particularly, to localizing information such as Web pages obtained over the Internet.

As its name implies, the World Wide Web is accessed by people from all over the world. Not long ago, almost all of the Web was in English because the United States was far ahead of the rest of the world when it came to on-line communications. Now, the rest of the world is quickly catching up. Japan, Germany, and China all have a large number of users, and the Spanish speaking population on the Web is increasing rapidly. The Web is becoming multicultural and multilingual and Web sites are becoming available in the native languages of many different regions of the world. This requires that the Web pages available on a company's Web site be localized so that people who speak different languages are able to read and understand the Web pages. Localization is the process of altering a Web page or other information or program so that it is appropriate for the area in which it is used. Localization may include, for example, the translation of strings and content. Text must be translated to the local language and things such as addresses, money formats, number formats, time formats, and date formats should be modified to conform to regional conventions.

Web pages are stored on Web servers on the Internet. Users request Web pages using HTTP (HyperText Transfer Protocol). HTTP provides users access to files which include text, graphics, and images using a language known as HTML (HyperText Markup Language). Web pages are typically accessed using an HTML compatible browser such as Netscape Navigator or Internet Explorer which specify a link to the Web server and specific Web page using a URL (Uniform Resource Locator).

Static HTML pages are relatively simple to understand and translate. These pages include HTML tags which may be used to identify plain text or attribute values which can then be translated. ASP (Active Server Pages) files, however, contain a large amount of scripting (e.g., VBScript or JavaScript) and localizable strings are often embedded in the scripting. It is often difficult to distinguish between localizable strings and functional strings in ASP pages or HTML pages with scripting. One option is to create a separate version of an HTML or ASP file for each language. However, if the scripts change over time, multiple files will need to changed, which can be time-consuming and error-prone. Another option is to conditionally include text for different languages. However, this significantly increases the size of the HTML or ASP file and makes the file harder to maintain. Yet another option is to pull strings from the file and put them into a resource dynamic link library (DLL). A translator tool is then used to localize the contents of the resource database to a desired language. One drawback to this method is that the resource DLLs need to be recompiled and are harder to deploy than HTML pages. Furthermore, the compiled translation may affect the functioning of the Web page. Thus, the recompiled code must be completely retested for even minor changes to insure that it functions properly. This adds considerable time and cost to the localization of Web pages.

Globally competitive companies need to provide versions of Web pages that are compatible with the requirements of each country in which they wish to compete. Companies often update their Web pages to provide information on new products or services. Any delays in providing a conformable Web page can reduce the market share in that particular country. It is thus, important to localize Web pages quickly and in an economical and efficient way.

There is, therefore, a need for a method and system for converting HTML and ASP files into a form that can be easily localized.

SUMMARY OF THE INVENTION

A computer implemented method for localizing Web pages is disclosed. The method generally includes reading a computer file containing HTML tags and scripts and identifying character strings located between the HTML tags and within the scripts. A modified version of the computer file is generated by replacing the identified character strings with variables. An include file containing the variables and associated character strings is also generated. The method further includes adding a reference to the include file in the modified version of the computer file.

In another aspect of the invention, a computer program product for localizing Web pages generally comprises code that reads a computer file containing HTML tags and scripts and identifies character strings located between the HTML tags and within the scripts. The product further comprises computer code that generates an include file containing the variables and associated character strings, computer code that adds a reference to the include file in the modified version of the computer file, and a computer readable medium that stores the computer code.

In yet another aspect of the invention a method for preparing a computer file for translation by a translator application generally comprises reading the computer file, identifying character strings within the computer file, and separating the character strings from functional strings in the file. The identified character strings are replaced with variables to create a modified version of the computer file. The method further includes generating a reference file containing the variables and associated character strings. The reference file is configured for translation by the translator application. A reference to the reference file is added to the modified computer file.

A system of the present invention for localizing Web pages generally comprises a processor operable to read a computer file containing HTML tags and scripts, identify character strings located between the HTML tags and within the scripts, generate a modified version of the computer file by replacing the identified character strings with variables, generate an include file containing the variables and associated character strings, and add a reference to the include file in the modified version of the computer file. The system further includes a memory device for storing the modified version of the computer file and the include file.

The above is a brief description of some deficiencies in the prior art and advantages of the present invention. Other features, advantages, and embodiments of the invention will be apparent to those skilled in the art from the following description, drawings, and claims.

BRIEF DESCRIPTION OF THE DRAWINGS

FIG. 5 illustrates an HTML file of the Web page of FIG. 4.

FIG. 7 illustrates the modified HTML file generated by the localizer.

FIG. 8 illustrates the include file generated by the localizer.

Corresponding reference characters indicate corresponding parts throughout the several views of the drawings.

DETAILED DESCRIPTION OF THE INVENTION

The following description is presented to enable one of ordinary skill in the art to make and use the invention. Descriptions of specific embodiments and applications are provided only as examples and various modifications will be readily apparent to those skilled in the art. The general principles described herein may be applied to other embodiments and applications without departing from the scope of the invention. Thus, the present invention is not to be limited to the embodiments shown, but is to be accorded the widest scope consistent with the principles and features described herein. For purpose of clarity, details relating to technical material that is known in the technical fields related to the invention have not been described in detail.

The present invention provides a method and system for converting a file (e.g., HTML and ASP files) into a form that can be easily localized (i.e., translated into other languages). As described in detail below, a program (referred to as a localizer) identifies character strings within the file and replaces them with variables located between HTML tags and within scripts. All of the variables are defined and initialized in one place (include file) so that it is easy to translate the contents of the variables into another language. This eliminates the need to create an entirely different Web page for each language.

Before describing the localization system and method, a computer system that may be used to convert documents for localization, localize documents, or view localized Web pages is described. Also described is an example of a network which may be used to view localized Web pages.

Figure 1:
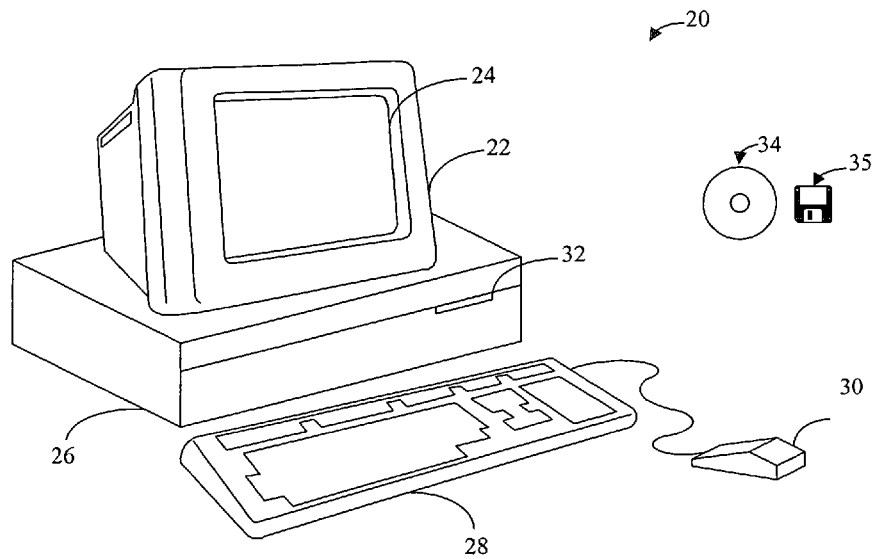
FIG. 1 is a schematic illustrating an example of a computer system that can be utilized to execute software of an embodiment of the invention.

FIG. 1 illustrates an example of a computer system 20 that can be used to execute software of an embodiment of the invention. The computer system 20 includes a display 22, screen 24, cabinet 26, keyboard 28, and mouse 30, which may include one or more buttons for interacting with a GUI (Graphical User Interface). Cabinet 26 houses a CD-ROM drive 32, system memory 42 and fixed storage 44 (see FIG. 2) which can be utilized to store and retrieve software programs incorporating computer code that implements aspects of the invention, data for use with the invention, and the like. Although CD-ROM 34 and floppy disk 35 are shown as exemplary computer readable storage media, other computer readable storage media including tape, flash memory, system memory, and hard drive can be utilized. Additionally, a data signal embodied in a carrier wave (e.g., in a network including the Internet) can be the computer readable storage medium. The computer system 20 may function through use of an operating system such as WINDOWS, DOS, UNIX, or LINUX, for example. It is to be understood that other operating systems may be used without departing from the scope of the invention. The operating system is preferably a multitasking system so that a number of different programs are allowed to execute simultaneously on a single processor.

Figure 2:
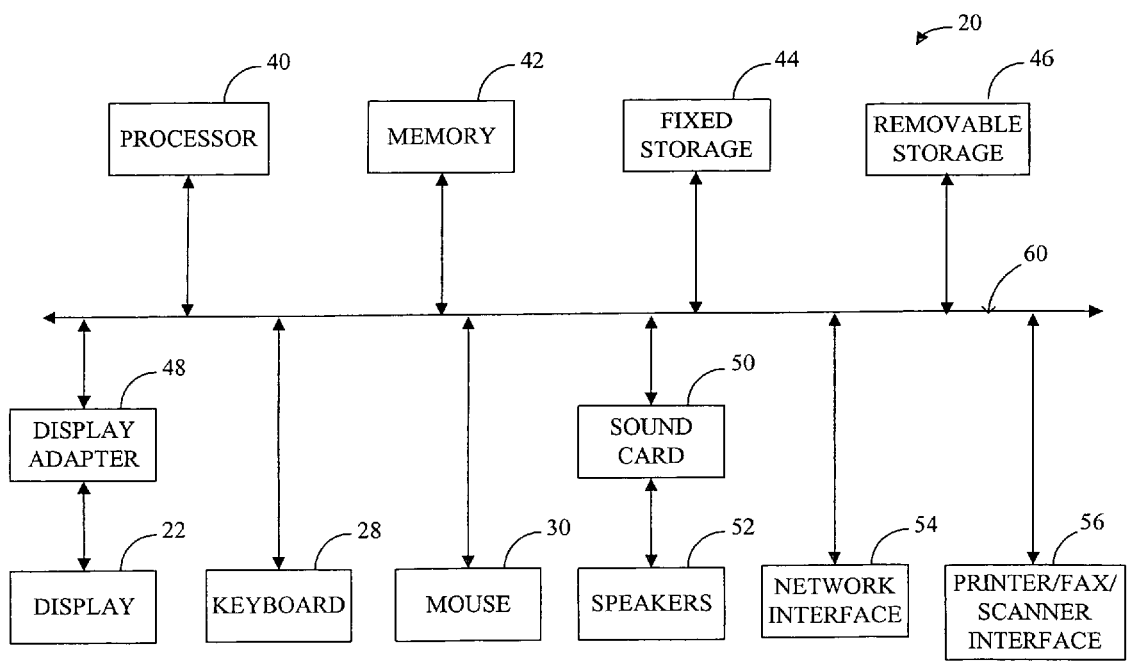
FIG. 2 is a system block diagram of the computer system of FIG. 1.

FIG. 2 shows a system block diagram of computer system 20 used to execute software of an embodiment of the invention. Computer system 20 further includes subsystems such as a central processor 40, system memory 42, fixed storage 44 (e.g., hard drive), removable storage 46 (e.g., CD-ROM drive), display adapter 48, sound card 50, transducers 52 (e.g., speakers, microphones, and the like), network interface 54, and printer/fax/scanner interface 56. Other computer systems suitable for use with the invention may include additional or fewer subsystems. For example, computer system 20 may include more than one processor 40 (i.e., a multi-processor system) or a cache memory.

The system bus architecture of computer system 20 is represented by arrows 60 in FIG. 2. However, these arrows are only illustrative of one possible interconnection scheme serving to link the subsystems. For example, a local bus could be utilized to connect the central processor 40 to the system memory 42 and display adapter 48. Computer system 20 shown in FIGS. 1 and 2 is but an example of a computer system suitable for use with the invention. Other computer architectures having different configurations or subsystems may also be utilized.

The method and system of the present invention may be used to localize files used in transmitting information over a network. In one embodiment, the network is the Internet and the information is transmitted in the form of Web pages. The files may be, for example HTML or ASP files, which are displayed on the computer screen 24. The user computers 20 preferably include a program or application known as a Web browser (e.g., Netscape Navigator or Microsoft Internet Explorer). The Web browser is used to connect to a Web server on the Internet and request a page, so that the browser can display the page on the computer screen 24. The Web browser also knows how to interpret a set of HTML tags within the page in order to display the page on the computer screen as the page's creator intended it to be viewed. The Web server responds to the browser's request for a page and delivers the page to the Web browser.

Figure 3:
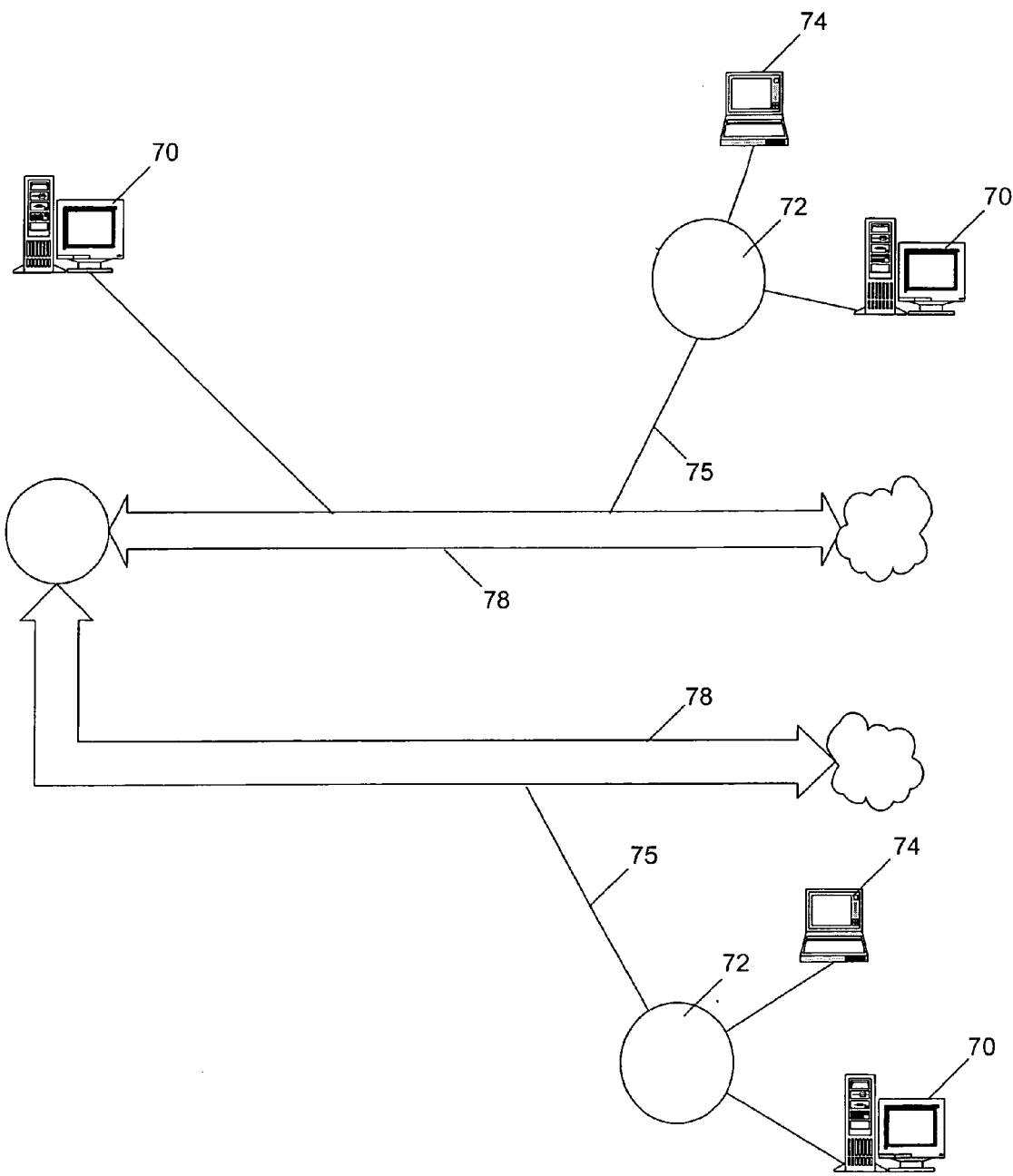
FIG. 3 is a schematic illustrating a network which may be used to display localized Web pages.

FIG. 3 illustrates the interconnection between components within a network over which the localized Web pages may be transmitted. The network includes one or more servers 70 for hosting one or more network sites. The servers 70 are typically connected to the network at points of presence (POPs) 72, established by network service providers at a variety of geographic locations. Also connected to the network via POPs 72 are multiple users 74. Transmission medium such as T1 and T3 lines, dial-up, DSL (Digital Subscriber Line), or cable connections may provide interconnections between the components within the network. A given geographic location, such as a metropolitan area, will typically contain multiple POPs 72 established by different network service providers. Each POP 72 may supply Internet connections to one or more users 74 and servers 70. As illustrated in FIG. 3, the POPs 72 may be connected directly to an Internet backbone 78 via a relatively high-speed transmission medium 75 such as a T1 line. The connection between POPs 72, users 74, and servers 70 may include any suitable transmission media, including, but not limited to, public telephone lines, T1 lines, T3 lines, and Ethernet connections. As discussed above, the Internet allows users from different areas of the world to access Web sites and view Web pages, thus, the pages must be easily converted from one language to another.

It is to be understood that the network configuration and interconnections shown in FIG. 3 and described herein, are provided for purposes of illustration only. One of ordinary skill in the art will readily appreciate that the present invention may be used to convert documents for localization and transmittal on networks more or less complex than that shown, in accordance with the teachings contained herein. Furthermore, it is to be understood that the method and system of the present invention may be used to convert documents other than Web pages for transmittal on networks other than the Internet, without departing from the scope of the invention.

Figure 4:
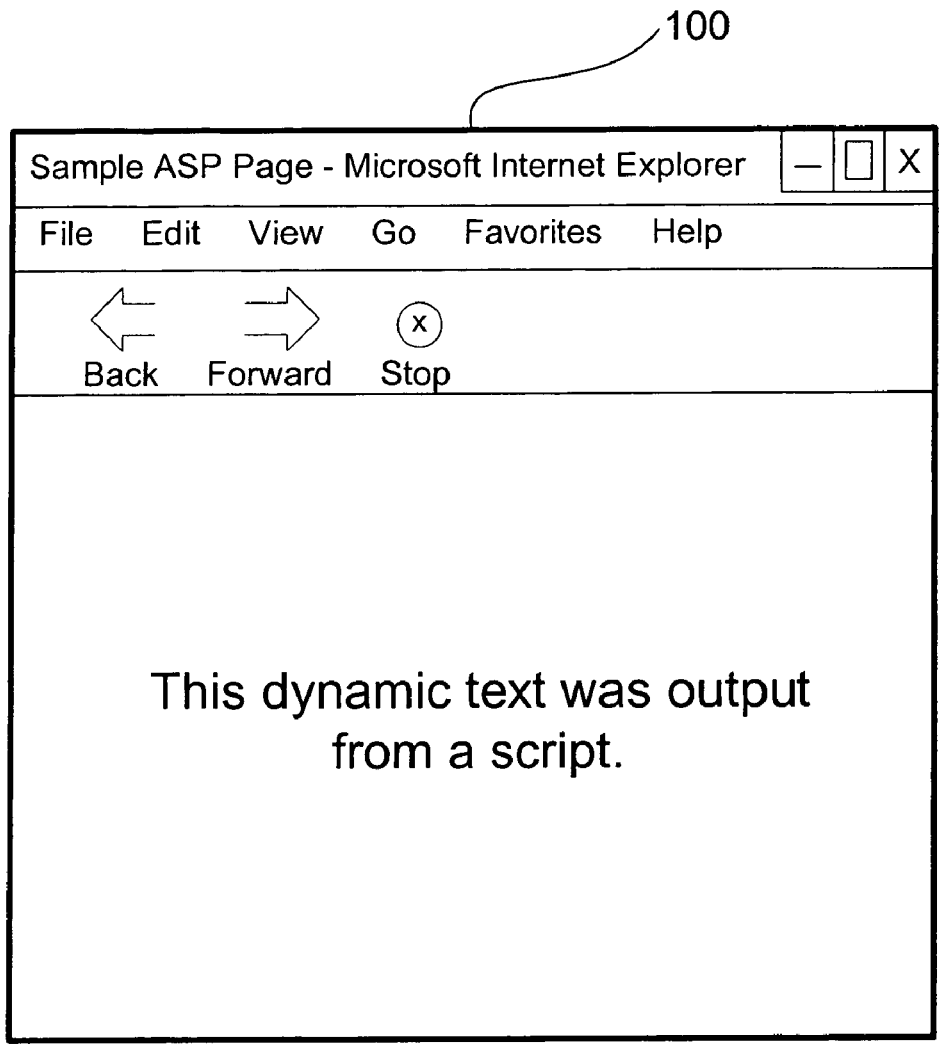
FIG. 4 is an example of a Web page displayed by an Internet Browser.

FIG. 4 displays a simple Web page 100 displayed on computer screen 24 by an Internet browser. The Web page is a text file that contains not only text, but also a set of HTML tags that describe how the text should be formatted when a browser displays it on the computer screen. FIG. 5 shows a file 102 containing the original text and HTML tags for the Web page of FIG. 4. The tags are simple instructions that tell the Web browser how the page should look when it is displayed. The tags tell the browser to do things such as change the font, size, or color, or arrange things in columns. The Web browser interprets these tags to decide how to format the text on the screen. HTML tags consist of a left angle bracket (<), a tag name, and a right angle bracket (>). Tags are usually paired (e.g., <H1> and </H1>) to start and end the tag instruction. The end tags looks just like the start tag except a slash (/) precedes the text within the brackets. Every HTML document includes certain standard HTML tags. The required elements are <html>, <head>, <title>, and <body> tags (and their corresponding end tags). The head element identifies the first part of the HTML coded document and contains the title. The title element contains the document title which is typically displayed in the title bar at the top of the browser window (e.g., "Sample ASP Page" as shown in FIG. 4). The body contains the content of the document which is displayed within the text area of the browser window. The body may include, for example, headings, paragraphs, lists, and text. In the example of FIGS. 4 and 5, the body includes the text "This dynamic text was output from a script". The document may also contain links which are used to link text or images to another document. The HTML document can be created using any text editor (e.g., Emacs, SimpleText, Notepad), as is well known by those skilled in the art.

The Web page may also be an Active Server Page (ASP). The ASP file is a text file which may contain text, HTML tags, and script commands. ASP files allow Web developers to create server-side scripted templates that generate dynamic, interactive Web server applications. By embedding special program codes in standard HTML pages, a user can access data in a database, interact with page objects such as Active-X or Java components, or create other types of dynamic output. HTML includes a <script> tag that is used to incorporate scripts into HTML. The Web browser receives scripts along with the rest of the Web document and parses and processes the scripts. Active Server Pages can provide a scripting environment for a number of scripting languages (e.g., JavaScript or VBScript). The script language is identified in an HTML tag at the beginning of the script procedure. VBScript is generally the default language of Active Server Pages. Scripts may be used to assign a value to a variable, instruct the Web server to send something, such as the value of a variable to a browser, or combine commands into procedures. A variable is a placeholder that refers to a computer memory location where program information that may change during the time the script is running is stored. Variables are declared explicitly in the script using a "Dim" statement, as shown in FIG. 8 and described below with respect to the include file.

Figure 6:
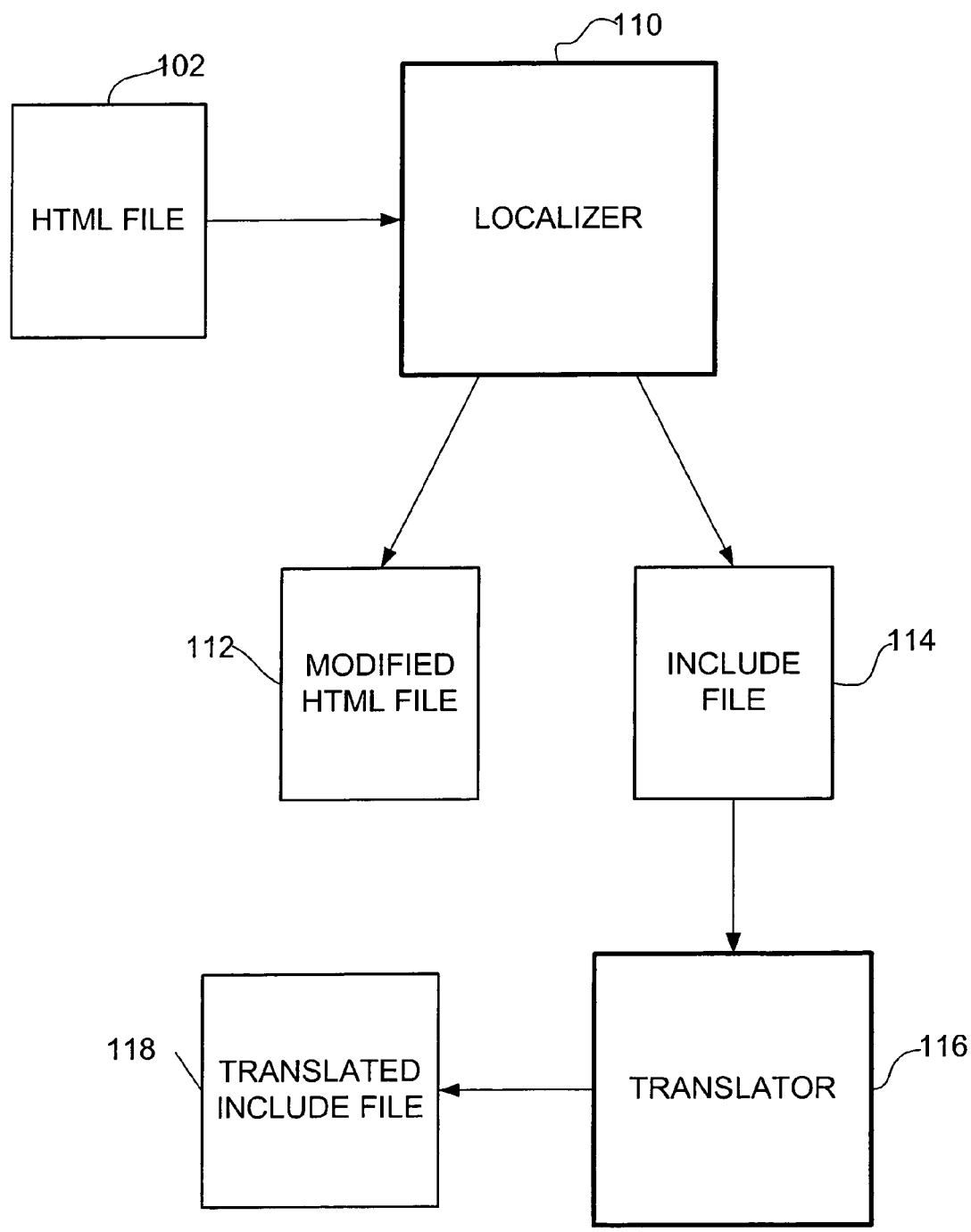
FIG. 6 is a block diagram illustrating a localizer of the present invention used to read the HTML file and generate a modified HTML file and an include file for translation by a translator application.

FIG. 6 is a block diagram illustrating the processing of an HTML or ASP file 102 by a localizer application 110 of the present invention. It is to be understood that the term localizer as used herein refers to an application that prepares a file for translation. Thus, the localizer may only perform a portion of the localization process. The localizer 110 reads the HTML or ASP file 102 and generates a modified HTML file 112 that includes variables in place of any character strings located in scripts and between HTML tags, as shown in FIG. 7. The localizer 110 parses the original file 102, identifies plain text strings in both HTML and script, and replaces those strings with variables. The localizer 110 thus separates the logic from content within file 102. The strings are replaced with VBScript variables and an include file 114 is generated that defines and initializes the variables. The variables are each assigned a value in the include file 114. For example, the title "Sample ASP Page" is replaced with the variable IDS_SAMPLE_ASP_PAGE, as shown in the include file 114 of FIG. 8. The include file 114 is preferably a VBScript server side include file that contains all of the variables and associated character strings that the variables were used to replace. A human translator is then used to translate character strings of the include file 114 into a different language and create a translated include file 118. A translator tool 116 may also be used to assist in translation of the file 114.

The modified HTML file 112 is revised to conditionally include the correct version of the translated include file. For example, to conditionally include different include files, the programmer may revise the include file as follows:

```
<%
    Dim IDS_THIS_IS_STATIC_TEXT_BETWEE
    Dim IDS_SAMPLE_ASP_PAGE
    Dim IDS_THIS_DYNAMIC_TEXT_WAS_OUT
If Session.CodePage=1252 Then 'ISO character set (English)
    IDS_THIS_IS_STATIC_TEXT_BETWEE="This is static text between HTML tags"
    IDS_SAMPLE_ASP_PAGE="Sample ASP Page"
    IDS_THIS_DYNAMIC_TEXT_WAS_OUT="This dynamic text was output from a script."
End If
%>
```

Subsequent include files do not have to declare (dimension, or Dim) the variables. For example, a Korean include file included after the English include file may be as follows:

```
<%
If Session.CodePage=949 Then 'Korean
    IDS_THIS_IS_STATIC_TEXT_BETWEE="This is static text between HTML tags in Korean"
```

```
IDS_SAMPLE_ASP_PAGE="Sample ASP Page in
    Korean"
IDS_THIS_DYNAMIC_TEXT_WAS_OUT="
    This dynamic text was output from a script in
    Korean."
End If
%>
```

The localization process is described in further detail with respect to the flowcharts of FIGS. 9–12. In general, the localizer 110 searches for comments, scripts, HTML tags, HTML keywords, and text strings within file 102 and replaces them with tokens. A token is simply a placeholder that is easily parsable. One token may be, for example, $#$Tagnn$#$ (where nn is a unique positive integer). The comments refer to comments included within the file. For example, the statement "This is a comment. The Parser should ignore it" of the HTML file of FIG. 5 is a comment. The HTML tags in FIG. 5 include the pairs <html>, <head>, and <body>. The text strings are located between HTML tags. For example, in FIG. 5, "Sample ASP Page" is a text string. An example of HTML keywords are:

=null or blank space
> =greater than symbol (>)
< =less than symbol (<)

Figure 13:
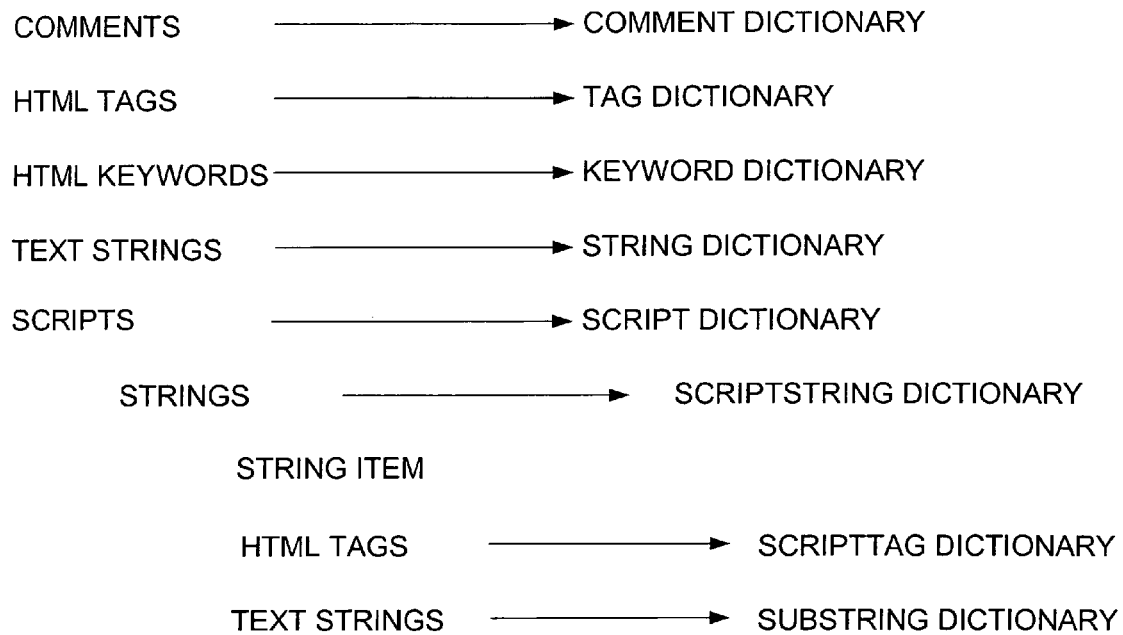
FIG. 13 is a list of items contained within a file to be localized and corresponding dictionaries used by the localizer to temporarily store and separate the items.

Each comment, script, HTML tag, HTML keyword, and text string goes into a corresponding dictionary. FIG. 13 shows a list of items located in an ASP file to be localized and the corresponding dictionaries. As described below, the items are separated by the localizer 110 and temporarily stored in the appropriate dictionary. FIG. 13 also shows the hierarchical relationship between the items. For example, scripts contain strings which contain string items, HTML tags, and text strings. The localizer 110 first separates top level components (comments, HTML tags, HTML keywords, text strings and scripts) and separates strings within the scripts. The localizer 110 then breaks down components of the strings (string items, HTML tags, and text strings).

Figure 9:
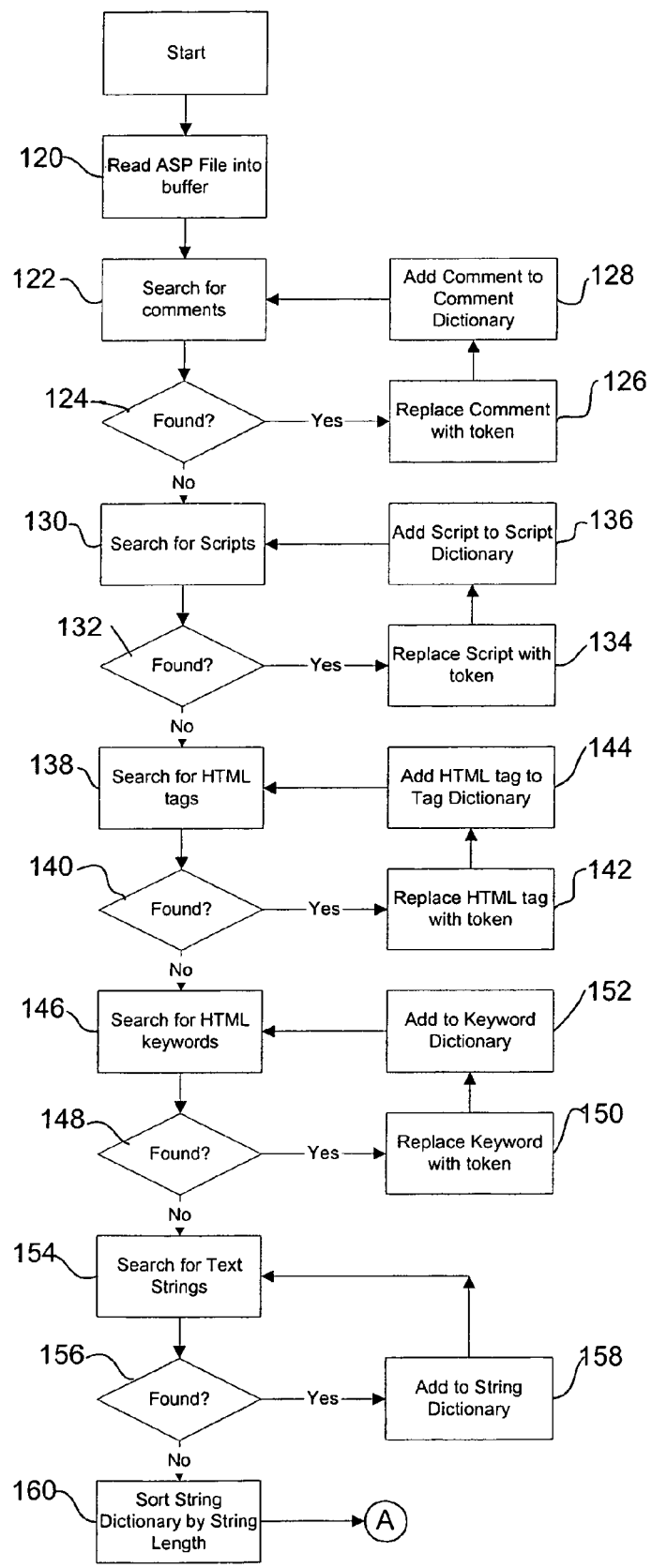
FIG. 9 is a flowchart illustrating a process of the present invention for localizing Web pages.

Referring now to FIG. 9, the ASP file is read into a buffer at step 120. The localizer 110 first searches for comments (step 122). If comments are found they are replaced with a token and added to a Comment Dictionary (steps 124, 126, and 128). The localizer 110 next searches for scripts (step 130). If any scripts are found they are replaced with tokens and added to a Script Dictionary (steps 132, 134, and 136). This process is then repeated for HTML tags. Each HTML tag is replaced with a token and the tag is inserted into a Tag Dictionary (steps 138, 140, 142, and 144). The localizer 110 then searches for HTML keywords, replaces the keywords with tokens, and adds the keywords to a Keyword Dictionary (steps 146, 148, 150, and 152). At this point, all that is left in the document are text strings and tokens. Parsing and extracting of text strings is easily performed, as is well known by those skilled in the art. The text strings are added to a Text String dictionary (steps 154, 156, and 158). The strings within the String Dictionary are sorted by string length (step 160).

Figure 10:
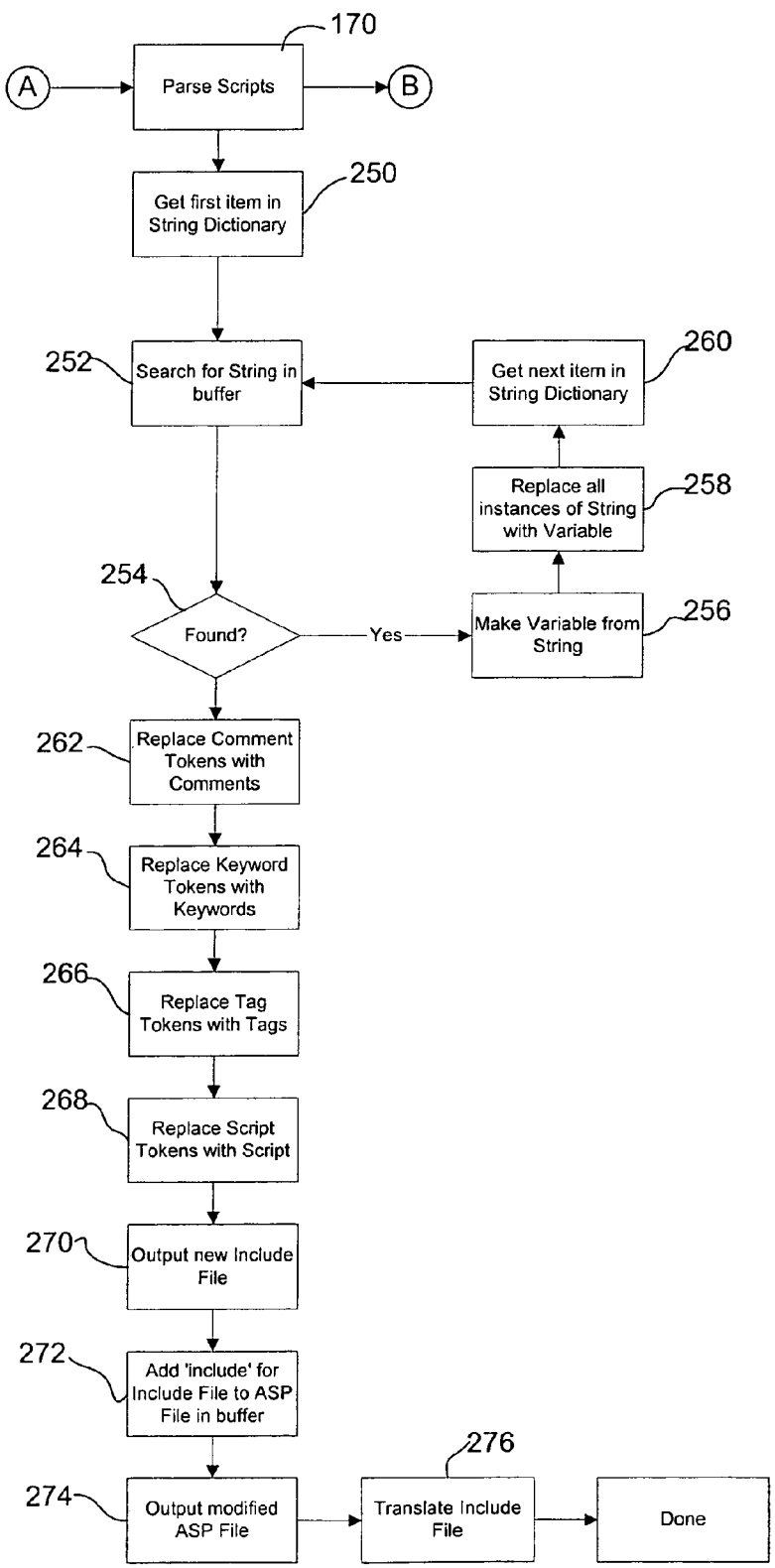
FIG. 10 is a continuation of the flowchart of FIG. 9.
Figure 11:
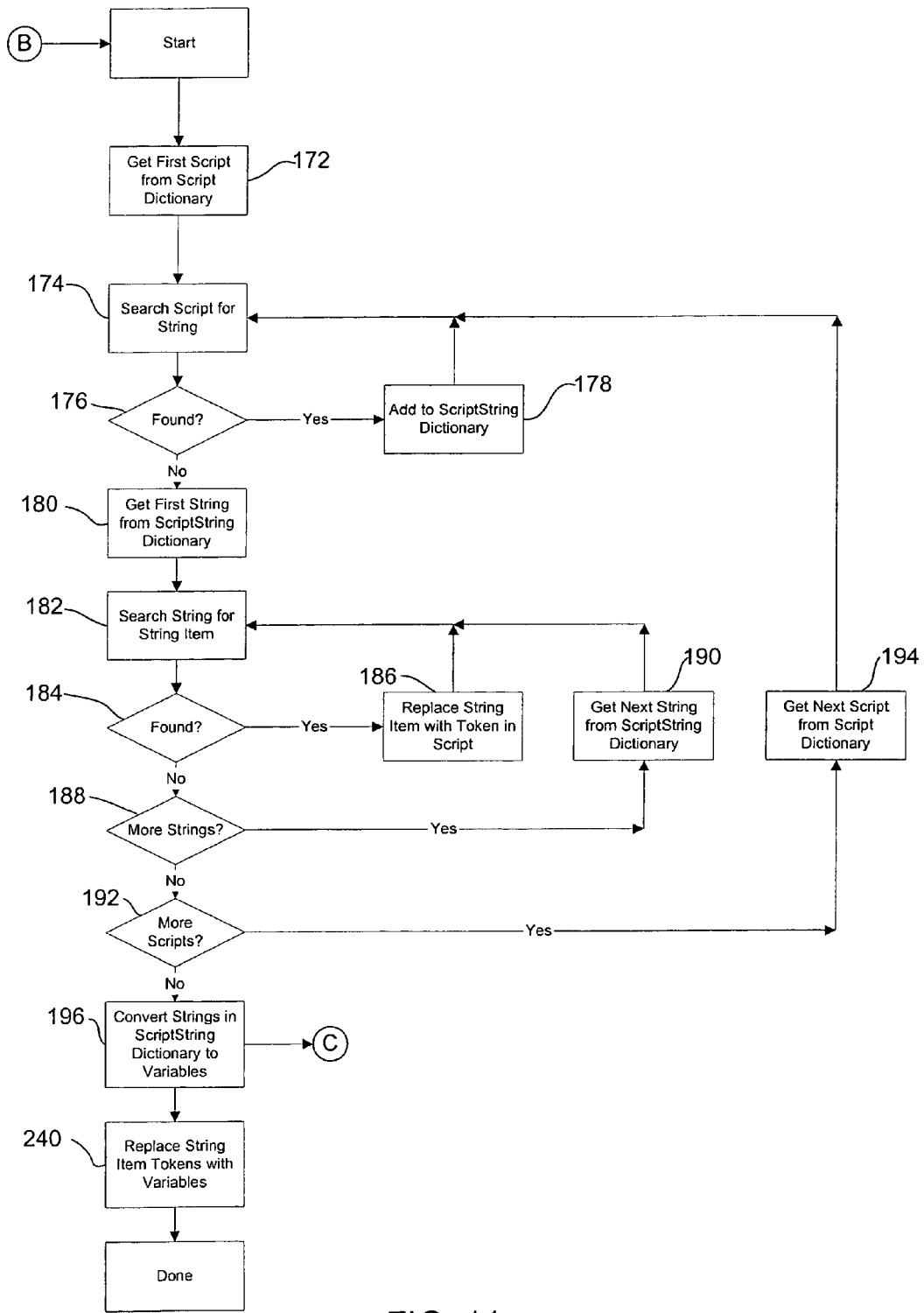
FIG. 11 is a flowchart illustrating a process for parsing scripts during the localization process.
Figure 12:
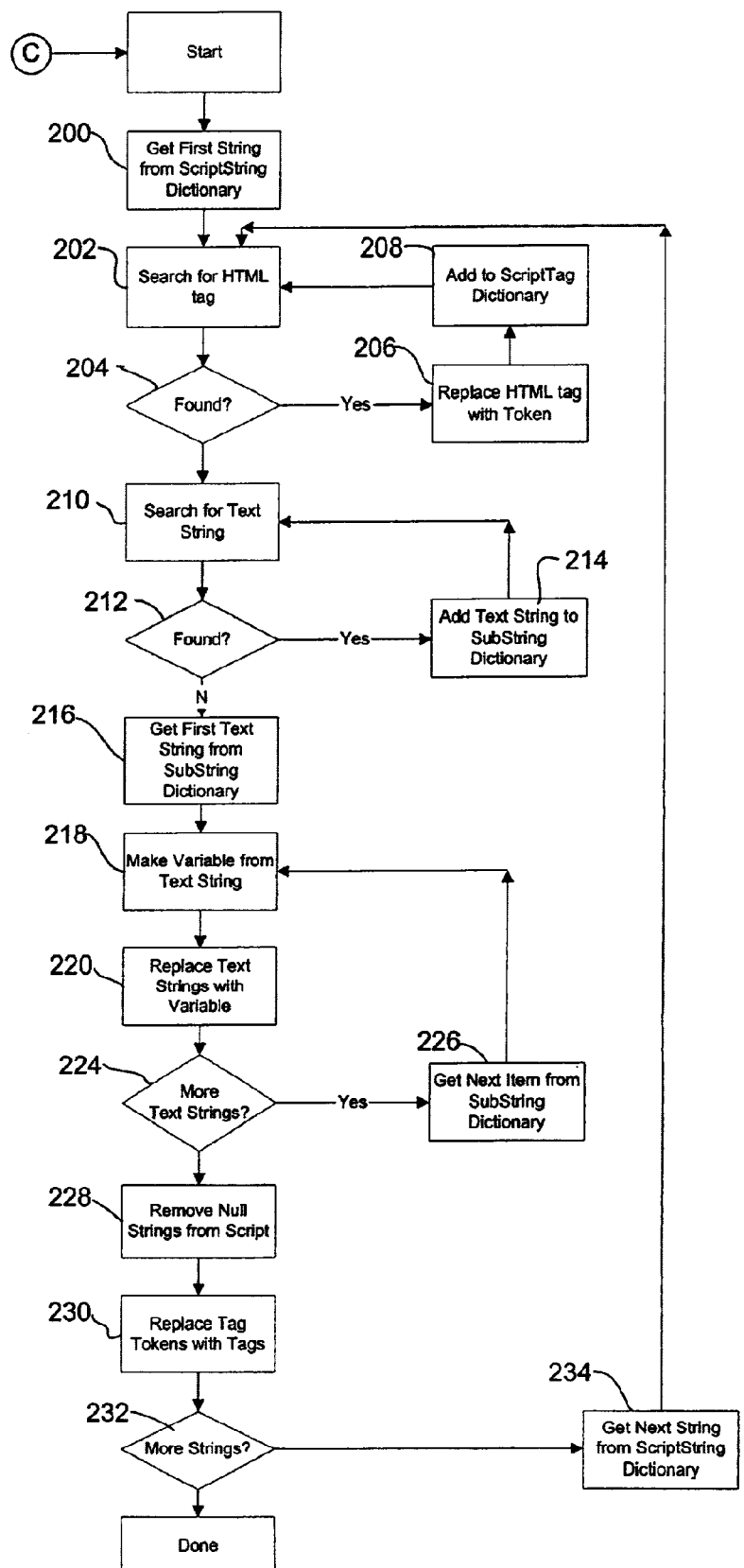
FIG. 12 is a flowchart illustrating a process for converting strings to variables during the localization process.

Referring now to FIGS. 10 and 11, the localizer 110 next parses the scripts (step 170). The localizer 110 pulls the first script from the Script Dictionary (step 172) and searches for strings within the script (step 174). Each string is added to a ScriptString Dictionary (steps 176 and 178). The localizer 110 then pulls each string from the ScriptString Dictionary and searches for string items (steps 180 and 182). For example, an entry in the ScriptString Dictionary may be:

"<center>This dynamic text was output from a script.</center>"

The localizer 110 breaks this into three pieces: two html tags and one "string item". The string item is "This dynamic text was output from a script", and the HTML tags are "<center>" and "</center>". After the program is run, the above script is changed to:

"<center>" & IDS_THIS_DYNAMIC_TEXT_WAS_OUT & "</center>"

This script is three strings (two constant strings and one variable) that are concatenated together at runtime (& is the concatenation operator in VBScript).

The string items are replaced with tokens in the script (steps 184 and 186). This is repeated for each string in the ScriptString Dictionary (steps 188 and 190). The localizer 110 repeats steps 174 through 188 for each script (steps 192 and 194). The localizer 110 then converts each string from the ScriptString Dictionary to a variable as described in the flowchart of FIG. 12 (step 196).

Each string from the ScriptString Dictionary is searched for HTML tags (steps 200 and 202). Each HTML tag is replaced with a token and added to a ScriptTag Dictionary (steps 204, 206, and 208). The strings within the ScriptString dictionary are then searched for text strings (step 210) and each text string is added to a SubString Dictionary (steps 212 and 214). Each text string from the SubString dictionary is replaced with a variable (steps 216, 218, 220, 224, 226). The scripts are then searched for Null strings which are removed from the scripts (step 228). The localizer 110 next replaces all of the HTML tag tokens with the original HTML tags (step 230). This process is repeated for each string in the ScriptString dictionary (steps 232 and 234). Returning again to the flowchart of FIG. 11, the string item tokens are replaced with variables at step 240. This completes the parse scripts step 170.

Returning again to FIG. 10, the buffer is searched for text strings from the String Dictionary at steps 250 and 252. Each text string is replaced with a variable at steps 254, 256, 258, and 260. The comment tokens, keyword tokens, HTML tag tokens, and text script tokens are then replaced with the corresponding original comment, keyword, tag, and text script, respectively (steps 262, 264, 266, and 268). The include file is generated at step 270. An "include" line is added to the ASP file to refer to the include file (step 272) and the modified ASP file 112 is generated at step 274. The translator 116 may then be used to translate the include file 114 as required (step 276).

It will be observed from the foregoing that the method and system of the present invention allow for the conversion of HTML and ASP files into a form that can be easily translated to a local language.

Although the present invention has been described in accordance with the embodiments shown, one of ordinary skill in the art will readily recognize that there could be variations made to the embodiment without departing from the scope of the present invention. Accordingly, it is intended that all matter contained in the above description and shown in the accompanying drawings shall be interpreted as illustrative and not in a limiting sense.

What is claimed is:

1. A computer implemented method for localizing Web pages, the method comprising:
   reading a computer file containing HTML, tags and scripts;
   identifying character strings located between the HTML tags and within the scripts;
   generating a modified version of the computer file by replacing the identified character strings with variables;

generating an include file containing the variables and associated character strings;

adding a reference to the include file in the modified version of the computer file; and translating the character strings of the include file to a language different than that of the character strings in the original computer file;

wherein adding a reference to the include file comprises adding a reference to the translated include file;

wherein the modified version of the computer file and the include file is stored in a Web server connected to the Internet;

wherein adding a reference to the include file comprises adding a reference to a translated version of the include file based on a user requesting a Web page from the Web server;

wherein the computer file is read into a buffer, and a localizer searches for comments, wherein, if comments are found, the comments are each replaced with a comment token and added to a comment dictionary, the localizer further searches for scripts, wherein, if scripts are found, the scripts are each replaced with a script token and added to a script dictionary, the localizer further searches for HTML tags, wherein, if HTML tags are found, the HTML tags are each replaced with an HTML tag token and added to a tag dictionary, the localizer further searches for key words, wherein, if key words are found, the key words are each replaced with a key word token and added to a key word dictionary, whereby only the tokens and text strings are remaining thereafter.

2. The method of claim 1 wherein the computer file is an ASP file.

3. The method of claim 1 wherein generating an include file comprises generating a VBScript file.

4. A computer program product for localizing Web pages, comprising:

computer code that reads a computer file containing HTML tags and scripts;

computer code that identifies character strings located between the HTML tags and within the scripts;

computer code that generates an include file containing the variables and associated character strings;

computer code that adds a reference to the include file in the modified version of the computer file; and computer code that translates the character strings of the include file to a language different than that of the character strings in the original computer file;

a computer readable medium that stores the computer code;

wherein adding a reference to the include file comprises adding a reference to the translated include file;

wherein the modified version of the computer file and the include file is stored in a Web server connected to the Internet;

wherein adding a reference to the include file comprises adding a reference to a translated version of the include file based on a user requesting a Web page from the Web server;

wherein the computer file is read into a buffer, and a localizer searches for comments, wherein, if comments are found, the comments are each replaced with a comment token and added to a comment dictionary, the localizer further searches for scripts, wherein, if scripts are found, the scripts are each replaced with a script token and added to a script dictionary, the localizer further searches for HTML tags, wherein, if HTML tags are found, the HTML tags are each replaced with an HTML tag token and added to a tag dictionary, the localizer further searches for key words, wherein, if key words are found, the key words are each replaced with a key word token and added to a key word dictionary, whereby only the tokens and text strings are remaining thereafter.

5. The computer product of claim 4 wherein the computer readable medium is selected from the group comprising of CD-ROM, zip disk, floppy disk, tape, flash memory, system memory, and hard drive.

6. A system for localizing Web pages, the system comprising:

a processor operable to read a computer file containing HTML tags and scripts, identify character strings located between the HTML tags and within the scripts, generate a modified version of the computer file by replacing the identified character strings with variables, generate an include file containing the variables and associated character strings, and add a reference to the include file in the modified version of the computer file; and a memory device for storing the modified version of the computer file and the include file;

wherein the character strings of the include file are translated to a language different than that of the character strings in the original computer file;

wherein adding a reference to the include file comprises adding a reference to the translated include file;

wherein the modified version of the computer file and the include file is stored in a Web server connected to the Internet;

wherein adding a reference to the include file comprises adding a reference to a translated version of the include file based on a user requesting a Web page from the Web server;

wherein the computer file is read into a buffer, and a localizer searches for comments, wherein, if comments are found, the comments are each replaced with a comment token and added to a comment dictionary, the localizer further searches for scripts, wherein, if scripts are found, the scripts are each replaced with a script token and added to a script dictionary, the localizer further searches for HTML tags, wherein, if HTML tags are found, the HTML tags are each replaced with an HTML tag token and added to a tag dictionary, the localizer further searches for key words, wherein, if key words are found, the key words are each replaced with a key word token and added to a key word dictionary, whereby only the tokens and text strings are remaining thereafter.

7. A method for preparing a computer file for translation by a translator application, the method comprising:

reading the computer file;

identifying character strings within the computer file and separating the character strings from functional strings in the file;

replacing the identified character strings with variables to create a modified version of the computer file;

generating a reference file containing the variables and associated character strings, the reference file being configured for translation by the translator application; and adding a reference to the reference file within the modified computer file;

wherein the character strings of the reference file are translated to a language different than that of the character strings in the original computer file;

wherein adding a reference to the reference file comprises adding a reference to the translated reference file;

wherein adding a reference to the reference file comprises adding a reference to a translated version of the reference file based on a user requesting a Web page from the Web server;

wherein the computer file is read into a buffer, and a localizer searches for comments, wherein, if comments are found, the comments are each replaced with a comment token and added to a comment dictionary, the localizer further searches for scripts, wherein, if scripts are found, the scripts are each replaced with a script token and added to a script dictionary, the localizer further searches for HTML tags, wherein, if HTML tags are found, the HTML tags are each replaced with an HTML tag token and added to a tag dictionary, the localizer further searches for key words, wherein, if key words are found, the key words are each replaced with a key word token and added to a key word dictionary, whereby only the tokens and text strings are remaining thereafter.

8. The method of claim 7 wherein the computer file is an HTML file containing HTML tags.

9. The method of claim 7 wherein the computer file is an ASP file.

10. The method of claim 7 wherein generating a reference file comprises generating a server side include file.

11. The method of claim 10 wherein the include file is a VBScript file.

12. The method of claim 1 wherein the text strings are parsed, extracted and added to a text string dictionary for being sorted by string length.

13. The method of claim 12 wherein the localizer parses the scripts by pulling a first script from the script dictionary and searching for text strings within the first script, wherein each text string is added to a script-string dictionary.

14. The method of claim 13 wherein the localizer pulls each text string from the script-string dictionary and searches for string items.

15. The method of claim 14 wherein the string items are replaced with tokens in the first script.

16. The method of claim 15 wherein each string from the script-string dictionary is converted to a variable and is searched for HTML tags.

17. The method of claim 16 wherein each HTML tag is replaced with a token and added to a script-tag dictionary.

18. The method of claim 17 wherein the strings within the script-string dictionary are searched for text strings, and each text string is added to a sub-string dictionary.

19. The method of claim 18 wherein each text string from the sub-string dictionary is replaced with a variable.

20. The method of claim 19 wherein null strings are removed.

21. The method of claim 20 wherein the localizer replaces all of the HTML tag tokens with original HTML tags.

22. The method of claim 21 wherein the buffer is searched for text strings from the string dictionary, and each text string is replaced with a variable.

23. The method of claim 22 wherein the comment tokens, the keyword tokens, the HTML tag tokens, and the script tokens are replaced with the corresponding original comment, keyword, tag, and script, respectively.

\* \* \* \* \*